Feb. 2, 1926.

M. L. SINDEBAND ET AL 1,571,304

ELECTRICAL SYSTEM

Filed Feb. 28, 1923    2 Sheets-Sheet 1

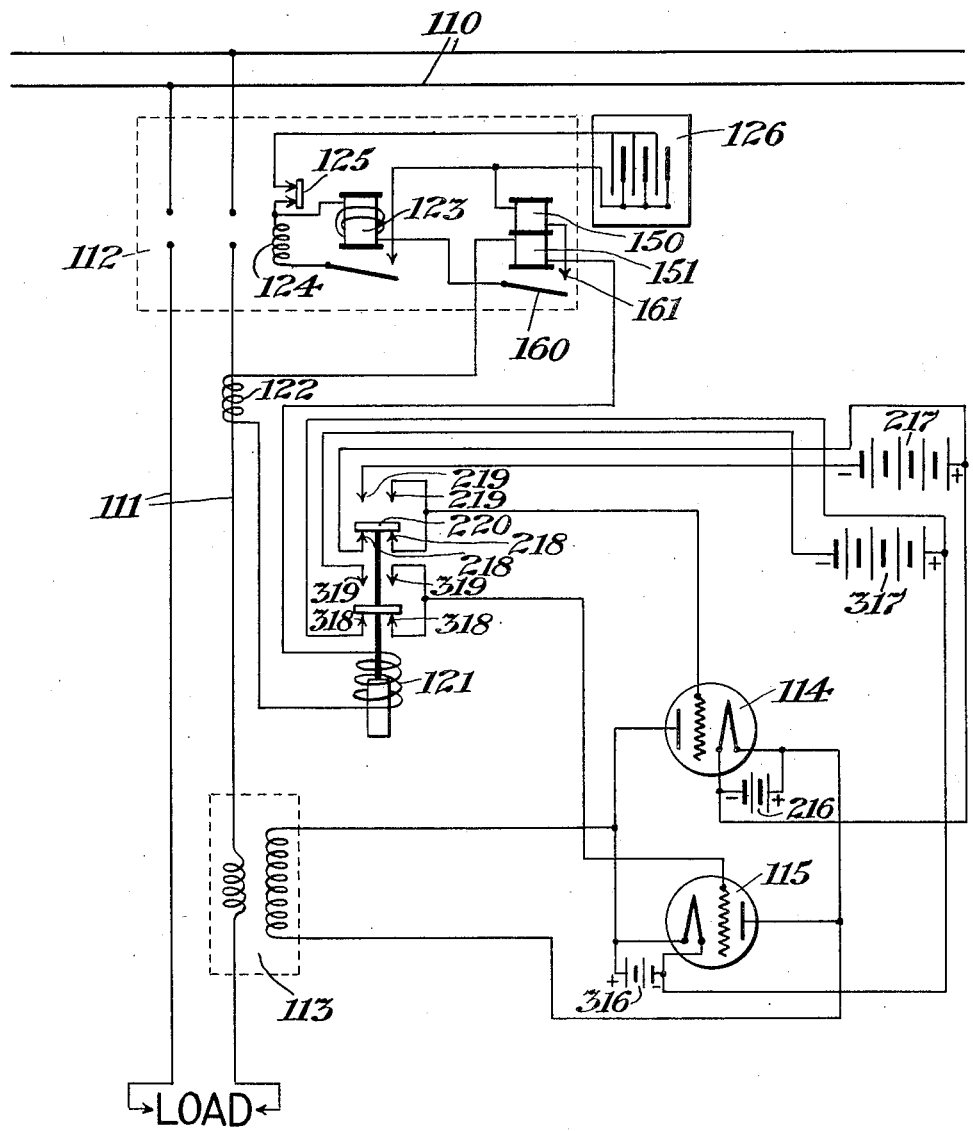

Patented Feb. 2, 1926.

1,571,304

UNITED STATES PATENT OFFICE.

MAURICE L. SINDEBAND AND JOSEPH W. MILNOR, OF NEW YORK, N. Y., ASSIGNORS TO WESTINGHOUSE ELECTRIC & MANUFACTURING COMPANY, A CORPORATION OF PENNSYLVANIA.

ELECTRICAL SYSTEM.

Application filed February 28, 1923. Serial No. 621,716.

*To all whom it may concern:*

Be it known that we, MAURICE L. SINDE-BAND and JOSEPH W. MILNOR, both citizens of the United States of America, and residents of New York, county and State of New York, have invented certain new and useful Improvements in Electrical Systems, of which the following is a full, clear, and exact description.

This invention relates to electric power transmission systems and has for certain of its objects to provide an improved method of and means for controlling such systems.

Another object is to provide a novel method of and means for automatically reducing an abnormal flow of current in feeders of a transmission system.

A further object is to provide a novel form of impedance device.

A still further object is to provide a novel form of circuit including electron tubes or rectifiers and in which current is permitted to flow during both halves of each cycle or, under different conditions, is prevented from flowing in either direction. Other objects and advantages will appear as the invention is hereinafter disclosed.

Referring to the drawings which illustrate what we now consider preferred physical embodiments of the invention:—

Fig. 2 is a similar view illustrating one of the many possible modifications.

Figure 1:
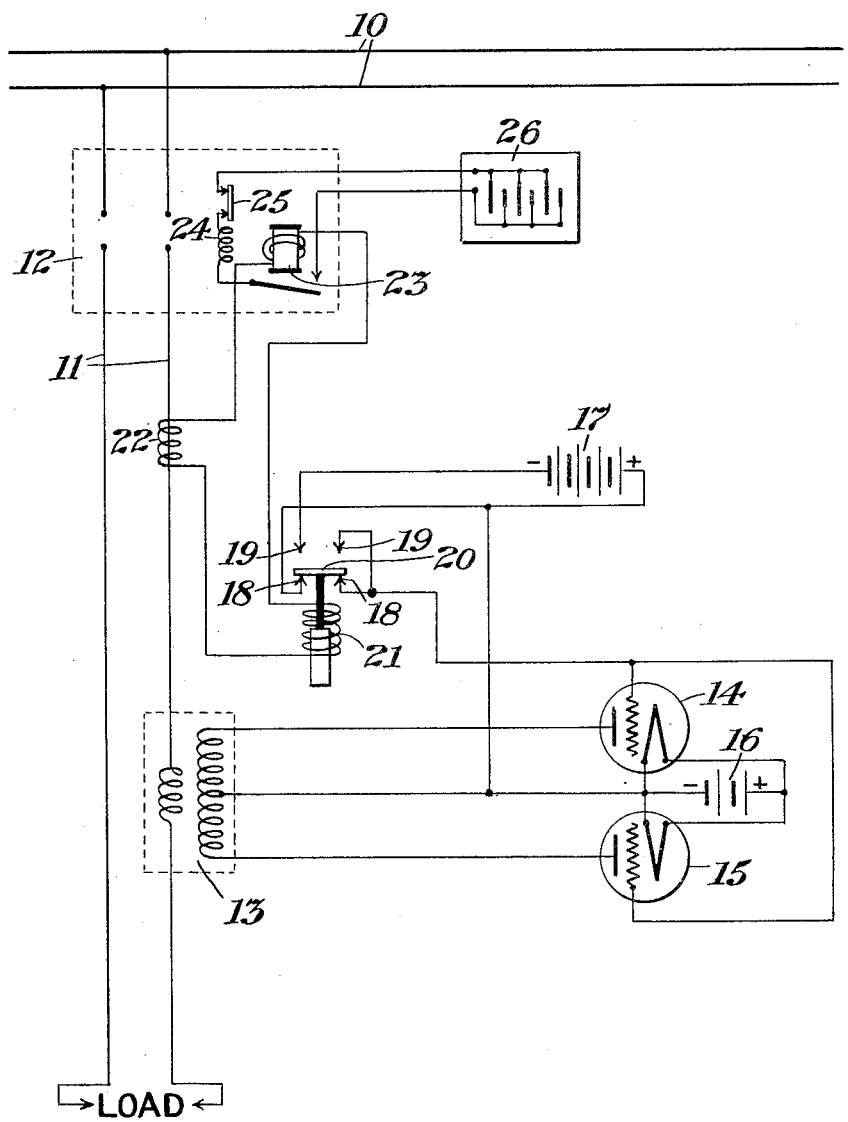
Fig. 1 is a diagrammatic view illustrating one form of the invention.

For the purpose of disclosing our method and apparatus we have selected the application of our invention to an electric power transmission system but, in view of the following disclosure, it will be appreciated that it may be applied to other uses and may assume other forms.

Referring to Fig. 1, the single phase A. C. bus 10 is adapted to supply alternating current to a feeder 11 through an oil switch or circuit-breaker 12, and thence to a load. It is now desirable practice, and is becoming common practice, to interconnect a comparatively large number of large capacity power plants. In other words, it is desirable, and therefore becoming common, practice to form a net-work of interconnected high tension feeders into which large numbers of large power plants feed. In case of a short circuit on a feeder, such as the feeder 11, of such a system or net-work, a tremendous short-circuit flows and the oil switch or circuit-breaker which controls that feeder must be capable of rupturing a tremendously heavy current, unless some method and means be provided for reducing such abnormal flow of current before the switch or circuit-breaker opens. Our invention provides a method of and means for automatically reducing flow of short-circuit or abnormal current and then causing the switch or breaker 12 to open. We shall now continue to describe the form of the invention illustrated in Fig. 1.

An impedance device, comprising a reactance device 13 and a plurality of electron tubes or rectifiers 14, 15, is provided. The reactance device 13 is shown in the form of a transformer having either an air or iron core, a primary winding connected in series with the feeder 11, and a secondary winding having a considerably greater number of turns than the primary winding. One of the outside terminals of the secondary winding is shown connected to the plate of the electron tube 14 and the other to the plate of the electron tube 15. The filaments or electron emitters of the tubes 14 and 15 are each shown connected to the middle point of the secondary winding of the reactance device or transformer 13, and to the negative pole of a source of E. M. F. such as an A battery 16. The other terminals of the filaments are shown connected to the positive terminal of the A battery 16.

The battery 16 supplies current to the filament of the tubes 14, 15 heating them to incandescence or to the temperature at which they emit electrons. In each tube a stream of negative electrons flows from filament to plate which acts as a space charge in accordance with the now generally accepted theory. In the absence of a grid, or when the grid is at the same potential as its corresponding filaments, each tube 14, 15, acts as a rectifier permitting current to flow from plate to filament but substantially preventing flow of electric current from filament to plate. Under these conditions, when alternating E. M. F. is impressed upon the primary winding of the transformer or reactance 13, current flows alternately in the following two paths:—

(1) Secondary winding of reactance device 13, to the plate of the electron tube 14, to the filament of the tube 14, to the secondary winding of the device 13, (2) Secondary winding of reactance device 13, to the plate of the electron tube 15, to the filament of the tube 15, to the secondary winding of the device 13.

It will be borne in mind that the impedance of the secondary system including the tubes 14, 15, is in effect the same as an impedance in the primary circuit of the device 13. In other words, in a practical sense and so far as effect on the transmission system is concerned, the impedance of the said secondary system has the same effect as an equivalent impedance in the primary circuit. The design is preferably such that when each rectifier 14, 15 is permitting substantially free flow of current through it in one direction, the reactance and impedance of the device 13 is low and offers no appreciable interference with the voltage regulation of the transmission system, but, when each rectifier 14, 15, imposes a high impedance to flow of current through it in either direction (or when current can flow through each tube in neither direction) and the secondary circuit of the device 13 is in effect open, the reactance and impedance of the latter is comparatively extremely high and greatly reduces the flow of current through the feeder 11. We provide, and shall now proceed to describe one form of means for automatically varying the effective impedance of the rectifiers 14, 15 to cause the impedance of the device 13 to assume the above mentioned higher value.

A source of E. M. F. such as a B battery 17 has its positive terminal connected to the filaments of the electron tubes 14 and 15. Normally the filaments are connected through the relay contacts 18, 18, to the grids of the tubes 14, 15. The negative pole of the B battery 17 is adapted to be connected to the grids of the tubes 14, 15 through the relay contacts 19, 19. When the relay coil 21 is deenergized the contacts 18—18 are connected by the bridge piece 20 and the contacts 19—19 are open. When the relay coil 21 is energized, the contacts 18—18 are open and the contacts 19—19 bridged and electrically connected. In other words, when the coil 21 is deenergized or not energized sufficiently to elevate its plunger, the grids are each at the same potential as that of each filament but when the coil 21 is sufficiently energized to elevate its plunger, each grid is at a lower or negative potential with respect to its filament. In the latter case the negative charge on each grid aids the space charge in its tube in driving the electrons back to the corresponding filament, resulting in a lowering of the plate current. The reduction of the plate current (or effective increase in impedance from plate to filament is directly dependent upon the E. M. F. of the B battery 17 and the design is such that when the contacts 19—19 are closed and contacts 18—18 open, the current flowing through the secondary of the device 13 is so low that the primary reactance and impedance of the device is very greatly increased.

The relay coil 21 is shown connected in series with the secondary winding 22 of a current transformer, coupled to the feeder 11, and a relay 23 hereinafter referred to. The design is such that when normal current is flowing in the feeder 11, the current flowing through the relay coil 21 is not sufficient to elevate the core and bridge piece 20 of the last-mentioned relay. However, when the current in the feeder 11 rises to an abnormal value, as in case of short circuit on the feeder 11, the current flowing through the coil 21 then causes the coil 21 to elevate its core or plunger to open contacts 18—18 and close contacts 19—19.

Means are also provided for causing the oil switch 12 to open automatically upon rise of current in the feeder to an abnormal value but after the abnormal flow of current has been reduced. One form of such means is shown in Fig. 1 and may be constructed substantially as follows.

As stated above, the relay 23 is serially connected with the coil 21 and secondary 22. The relay 23 is so designed that it will not pick up its armature so long as normal current is flowing in the feeder 11, but will pick up its armature upon abnormal rise in current in the feeder 11. The armature and front contact of the relay 23 are shown serially connected with the tripping coil 24 of the oil switch 12, the switch 25 (which is closed so long as and only when the oil switch is closed) and the battery or other suitable source of E. M. F. 26. The relay 23 is shown as a retarded relay and the design is such that, when the current in the feeder 11 rises to an abnormal value, the contacts 18—18 open and 19—19 close, the reactance 13 materially reduces the abnormal flow of current in the feeder 11 and then the oil switch 12 is tripped to open the circuit between the bus 10 and feeder 11.

The operation of the system shown in Fig. 1 may now be summarized as follows. When normal current is flowing through the feeder 11 the parts occupy the position shown in Fig. 1. Under this condition each grid is at the same potential as its corresponding filament and current is permitted to flow comparatively freely through each electron tube from plate to filament. The secondary of the reactance device 13 is thus, comparatively speaking, short-circuited and the impedance and reactance of the device 13 are so low as not to interfere seriously with the voltage regulation of the feeder line 11. However, when the current in the feeder 11 rises to an abnormal value, as in case of short circuit, the following actions take place automatically. The relay 21 opens the contacts 18—18 and closes the contacts 19—19. The potential of each grid is then negative with respect to its filament so that no substantial currents can flow through either tube 14, 15 in either direction. The secondary winding of the device is thus, comparatively speaking, open circuited and the reactance of the device 13 increases to such an amount as materially to reduce the current in the feeder 11. Thereupon, as described above, the oil switch 12 opens automatically to break the circuit to the feeder 11.

By virtue of our invention a comparatively small and inexpensive oil switch 12 may be employed on a heavy duty feeder system. Other advantages and applications of the invention will now appear, in view of the foregoing disclosure, to those skilled in the art. The invention is susceptible to modification in various respects. For example, instead of employing the now-preferred form illustrated in Fig. 1, that shown in Fig. 2 may be employed. In view of the description of the system shown in Fig. 1, the form shown in Fig. 2 need not be described at length but only briefly as follows.

The elements 110, 111, 112, 113, 114, 115, 121, 122, 123, 124, 125 and 126 correspond to the elements 10, 11, 12, 13, 14, 15, 21, 22, 23, 24, 25 and 26 respectively of Fig. 1. Instead of connecting the coil of the relay 123 in series with the windings 21 and 22, the said coil 123 is shown connected in series with the switch 125, armature and front contact of a relay having a stick or holding winding 150, the said holding winding 150, across the battery 126. The pick-up winding 151 is shown connected in series with the windings 121 and 122. One terminal of the secondary winding of the reactance device 113 is connected to the plate of one tube 114 and to the filament of the other tube 115. The other terminal of the secondary winding of the reactance device 113 is connected to the filament of the tube 114 and to the plate of the tube 115. Each filament is connected to a corresponding one of two A batteries 216, 316, as shown, to be energized thereby. Each grid is normally connected through a corresponding pair of normally closed contacts, 218—218, or 318—318, to its corresponding filament. In other words, the grid of each tube 114, 115, is normally at the same potential as the filament of that tube. When the coil 121 is energized sufficiently, the bridge pieces 220, 320 disengage the contacts 218, 318 respectively and close the contacts 219—219, and 319—319 respectively. This operation inserts each of the B batteries 217, 317 between the grid and filament of a corresponding one of the tubes 114 and 115 so that the potential of each grid will be negative with respect to its corresponding filament. The system shown in Fig. 2 is constructed and designed to operate substantially as follows.

Under normal conditions the parts are in, and remain in, the position shown in Fig. 2 and the feeder 111 is being supplied with alternating current, from the bus 110 through the oil switch 112, and is in turn supplying the load. At this time each grid is at the same potential as its filament so that each tube 114, 115 will permmit a comparatively free flow of current from plate to filament. Therefore, current flows in the secondary circuit of the device 113 at all times. During one half cycle the current flows through the said secondary winding and one of the tubes 114, 115 and during the next half cycle the current flows through the said secondary winding and the other of the tubes 114, 115, and so on. In other words, the said secondary winding of the device 113 is, comparatively speaking, short-circuited by one or the other of tubes 114, 115, and under this condition the reactance and impedance of the device 113 is so low as not seriously to interfere with the proper voltage regulation of the feeder 111. However, when the current in the feeder 111 rises to an abnormal value, as upon the short-circuiting of the said feeder 11, the coil 121 is energized sufficiently to elevate its core to open contacts 218—218 and 318—318 and to close contacts 219—219 and 319—319. Each grid is thereby placed at a negative potential with respect to its corresponding filaments, so that secondary winding of the device 113 is, comparatively speaking, open circuited. The reactance and impedance of the device 113 are thereby greatly increased and the current in the feeder 111 greatly reduced. Substantially at the same time that the coil 121 is sufficiently energized to cause it to elevate its core, the winding 151 is energized sufficiently to pick up the adjacent armature and cause it to engage its front contact. This closes a circuit including the battery 126, switch 125, coil 123, and the holding or stick winding 150. It will be noted that after the armature 160 has once closed upon the contact 161 it will remain in that position until the oil switch 112 opens even though the current in the winding 151 should be greatly reduced. The relay 123 is a retarded relay so that the armature of said relay 123 does not close upon its front contact until an appreciable time interval after operation of the relays 121 and 151, the said time interval being of such length as to permit the abnormal current in the feeder 111 to be materially reduced by the means above described. When the coil switch 112 opens, by virtue of energization of the tripping coil 124, the switch 125 opens automatically and deenergizes the windings 123 and 150.

In accordance with the provisions of the patent statutes, we have herein described the principle of operation of our invention, together with the apparatus which we now consider to represent the best embodiments thereof, but we desire to have it understood that the apparatus disclosed is only illustrative and that the invention can be carried out by other means. Also, while it is designed to use the various features and elements in the combinations and relations described, some of these may be altered and others omitted and some of the features of each modification may be embodied in the others without interfering with the more general results outlined, and the invention extends to such use.

What we claim is:—

1. The method of controlling an alternating current electric power transmission system which comprises interposing in said system an impedance including a space charge device and varying said space charge device.

2. The method of controlling the flow of alternating current in an electric power transmission system which comprises interposing in said system an impedance including a space charge, device and varying said space charge device to increase said impedance upon abnormal flow of current in said system.

3. In combination, an alternating current electric power transmission system, an impedance device including an electron tube coupled with said system, and means connected to said system for controlling said electron tube.

4. In combination, an alternating current electric power transmission system, an impedance including an electron tube coupled with said system, and means called into action upon abnormal rise in current in said system for automatically controlling said electron tube to reduce said current.

5. In combination, an alternating current electric power transmission system, a reactance device interposed in said system, connections including an electron tube for controlling said reactance device, and means electrically connected to said system for controlling said electron tube.

6. In combination, an electric power transmission system, a reactance device interposed in said system, means including an electron tube normally establishing a current-conducting path of comparatively low impedance across said device, and means called into action upon abnormal rise of current in said system for automatically governing said electron tube to increase the impedance of said current-conducting path.

7. In combination, an electric power transmission line, an impedance device including a rectifier coupled with said line, means called into action upon abnormal rise of alternating current in said line for substantially preventing flow of current through said rectifier, and means for subsequently automatically opening said line.

8. In combination, a reactance device, means comprising a transformer winding for impressing an alternating E. M. F. upon said reactance device, a plurality of rectifiers electrically connected to said reactance device for permitting current to flow therethrough during both halves of each cycle, and means controlled by the current flowing through the said transformer winding for varying the impedance of said rectifiers for decreasing the flow of current through said reactance device.

9. In combination, a transformer, means comprising a plurality of rectifiers connected to the secondary of said transformer for permitting flow of current through said secondary, and means controlled by the current flowing through the primary of said transformer for varying the impedance of said rectifiers for substantially preventing flow of current through said secondary in either direction.

10. In combination, an electric power transmission system including a feeder and circuit-breaker for controlling the supply of current to said feeder, an impedance device including a rectifier coupled with said system, means called into action upon abnormal rise of current in said feeder for controlling said rectifier to increase the impedance of said impedance device, and means automatically operable subsequent to the operation of said first-named means for causing said circuit-breaker to open.

11. In combination, an electric power transmission system including a feeder and circuit-breaker for controlling the supply of current to said feeder, an impedance device including an electron tube coupled with said system, means called into action upon abnormal rise of current in said feeder for changing the potential of the grid of said tube to increase the impedance of said impedance device, and means automatically operable subsequent to the operation of said first-named means for causing said circuit-breaker to open.

12. In combination, an electric power transmission system including a feeder and circuit-breaker for controlling the supply of current to said feeder, a transformer having a primary winding connected in series with said feeder and a secondary winding, a plurality of electron tubes and circuit connections electrically connecting the plate circuits of said tubes to said secondary winding, means controlled by abnormal rise of current in said feeder for causing the grid of each of said tubes to assume a potential negative with respect to its corresponding electron emitter, and means for automatically causing said circuit-breaker to open after an abnormal flow of current in said feeder has been reduced.

In testimony whereof we hereto affix our signatures.

MAURICE L. SINDEBAND.
JOSEPH W. MILNOR.

DISCLAIMER 1,571,304.—*Maurice L. Sindeband* and *Joseph W. Milnor*, New York, N.Y. ELECTRICAL SYSTEM. Patent dated February 2, 1926. Disclaimer filed May 3, 1934, by the assignee, *Westinghouse Electric & Manufacturing Company*.

Hereby enters the following disclaimer:

"1. Your petitioner hereby disclaims the subject matter of claims 1 and 2, except as to methods in which the space discharge device is of a type adapted to affect the flow in said system of both half waves of alternating current in substantially like degrees.

"2. Your petitioner hereby disclaims the subject matter of claims 3 and 4, except as to combinations in which the electron tube is of a type adapted to affect the flow in said system of both half waves of alternating current in substantially like degrees.

"3. Your petitioner hereby disclaims the subject matter of claim 6, except combination of a type in which the electron tube is of a type adapted to reduce the impedance of said reactance device for both half waves of alternating current in substantially like degrees.

"4. Your petitioner hereby disclaims the subject matter of claim 5, except combinations in which the electron tube is of a type adapted to reduce the impedance of said reactance device for both half waves of alternating current in substantially like degrees, and is of a type in which gaseous ions play a substantial part in current flow."

[*Official Gazette May 29, 1934.*]